United States Patent [19]
Sezi et al.

[11] Patent Number: 5,777,066
[45] Date of Patent: *Jul. 7, 1998

[54] METHOD FOR THE PRODUCTION OF POLY-O-HYDROXYAMIDES

[75] Inventors: Recai Sezi; Hellmut Ahne, both of Röttenbach; Eva Rissel, Forchheim, all of Germany

[73] Assignee: Siemens Aktiengesellschaft, München, Germany

[ * ] Notice: The portion of the term of this patent subsequent to Jun. 19, 2016, has been disclaimed.

[21] Appl. No.: 666,182

[22] Filed: Jun. 19, 1996

[30] Foreign Application Priority Data

Jun. 19, 1995 [DE] Germany ............... 195 22 157.5

[51] Int. Cl.$^6$ .................. C08G 73/00; C08G 69/08
[52] U.S. Cl. .................. 528/310; 528/170; 528/172; 528/173; 528/322; 528/332; 528/337; 528/347; 528/348
[58] Field of Search ................. 528/183, 170, 528/310, 322, 332, 348, 347, 337, 172, 173

[56] References Cited

U.S. PATENT DOCUMENTS

| | | | |
|---|---|---|---|
| 4,339,521 | 7/1982 | Ahne et al. | 430/192 |
| 4,395,482 | 7/1983 | Ahne et al. | 430/326 |
| 4,622,285 | 11/1986 | Ahne | 430/322 |
| 4,849,051 | 7/1989 | Ahne et al. | 156/659.1 |
| 5,021,320 | 6/1991 | Mueller et al. | 430/192 |
| 5,037,720 | 8/1991 | Khanna | 430/190 |
| 5,077,378 | 12/1991 | Mueller et al. | 528/185 |
| 5,134,218 | 7/1992 | Brennan et al. | 528/99 |
| 5,143,998 | 9/1992 | Brennan et al. | 528/99 |

FOREIGN PATENT DOCUMENTS

| | | |
|---|---|---|
| 0 023 662 | 5/1983 | European Pat. Off. . |
| 0 264 678 | 5/1988 | European Pat. Off. . |
| 0 291 779 | 7/1994 | European Pat. Off. . |

OTHER PUBLICATIONS

Labadie, J. et al., "Recent Advances in High Temperature Polymers For Microelectronic Applications," *SAMPLE Journal*, vol. 25, No. 6, Nov./Dec. 1989.

Soane, D. et al., "Resists in Microlithography," *Polymers in Microelectronics Fundamentals and Applications*, Amsterdam–Oxford–New York–Tokyo (1989), pp. 77–124. The month of publication is not available.

Proceedings of the 1992 International Conference on Multichip Modules, Apr. 1–3, 1992 Radisson Hotel Denver, pp. 394–400.

Mercer, F., "Aromatic Poly(ether imide oxadiazole)s," *High Performance Polymers*, vol. 4, No. 2 (1992), pp. 73–80. The month of publication is not available.

Ahne, H. et al., "Recent Advances in Photosensitive Polyimides," *Polymers for Advanced Technologies*, vol. 4, pp. 217–233.

Vollmert, B., "Polymer Chemistry", Springer–Verlag, New York (1973), pp. 213–214.

Primary Examiner—P. Hampton-Hightower
Attorney, Agent, or Firm—Kenyon & Kenyon

[57] ABSTRACT

A method for producing poly-o-hydroxy amides by conversion of an activated dicarboxylic acid derivative with a bis-o-aminophenol. A solution of the activated dicarboxylic acid derivative is added to a solution of the bis-o-aminophenol in a lactone, and a tertiary amine is added to the resulting mixture, wherein the lactone has the following structure:

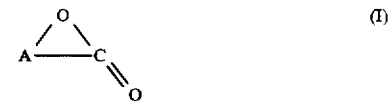

(I)

where A is —$(CR^1R^2)_m$— or —$(CR^3R^4)_n$—$NR^5$—.

$R^1$ to $R^5$ are independent of one another $R^1$ and $R^2$ are hydrogen, alkyl with 1 to 7 carbon atoms (linear or branched), —$CO(CH_2)_pCH_3$, or —$COO(CH_2)_pCH_3$, with p=0 or 1, $R^3$ and $R^4$ are hydrogen or alkyl with 1 to 3 carbon atoms (linear or branched), $R^5$ is hydrogen or methyl, m is a whole number from 2 to 11, and n is a whole number from 1 to 3.

11 Claims, No Drawings

METHOD FOR THE PRODUCTION OF POLY-O-HYDROXYAMIDES

BACKGROUND OF THE INVENTION

1. Field of the Invention

The invention relates to a method for the production of poly-o-hydroxyamides by conversion of an activated dicarboxylic acid derivative with a bis-o- aminophenol.

2. Description of Related Art

In microelectronics, highly heat-resistant polymers are required, particularly as protective and insulating layers, or as dielectrics (see, for example: "SAMPE Journal," Vol. 25 (1989), No. 6, pages 18 to 23, and "Proceedings of the 1992 International Conference on Multichip Modules," pages 394 to 400). Some of the polymers used, for example homopolymers and copolymers of aromatic polyethers as well as precursors of polyimides (PI) and polybenzoxazoles (PBO), demonstrate good solubility in organic solvents and good film formation properties, and can be applied to electronic components by means of spincoating (see, for example, "High Performance Polymers," Vol. 4 (1992), No. 2, pages 73 to 80, and "Polymers for Advanced Technologies," Vol. 4 (1993), pages 217 to 233). Polymer precursors of the type stated are cyclized, i.e., converted to the corresponding polymers (PI and PBO, respectively), by temperature treatment, thereby the final properties are obtained.

The properties of the polymer precursors vary depending not only on the type of polymer, but also on its molecular mass. Some polymer properties that are particularly important for the applications mentioned above, for example, the glass transition temperature or the mechanical strength, can be increased, i.e., improved by increasing the molecular mass. However, for these applications, the upper limit for the molecular mass is determined by, inter alia, the solubility, since the solubility decreases with an increasing molecular mass. In known production methods, the molecular mass is primarily regulated by the mole ratio of the starting substances, but this method is associated with disadvantages.

PI and PBO precursors can also be made photosensitive, for example by adding suitable photoactive components, and thereby structured directly, i.e., without using an auxiliary resist. When using alkali-soluble precursors, photosensitive PBO precursors—as compared to most photosensitive PI precursors—result in the advantage of structurability in the positive mode and the possibility of aqueous-alkaline development (see EP-PS 0 023 662, EP-OS 0 264 678 and EP-PS 0 291 779). Except for cyclization, the photolithographic process used is the same as for structuring prior art positive resists based on novolaks and quinonazides, a process used worldwide in numerous production lines (see, for example, D.S. Soane and Z. Martynenko "Polymers in Microelectronics—Fundamentals and Applications," Elsevier, Amsterdam 1989, pages 77 to 124).

The most common method for the production of alkali-soluble PBO precursors, i.e., of poly-o-hydroxyamides, is the conversion of a dicarboxylic acid chloride with a suitable bis-o-aminophenol. To capture the hydrochloride which is formed during the reaction, a soluble base, such as pyridine, is typically added (see EP-PS 0 264 678 and EP-PS 0 291 779). In general, the bis-o-aminophenol is presented, together with the base, in a suitable solvent, and the acid chloride is slowly dripped in; this work is preferably conducted at a temperature between —15° and 0° C. Suitable solvents are, for example, N,N-dimethyl acetamide and N-methyl pyrrolidone, as well as structurally related derivatives of these.

For condensation reactions of the type indicated above, between two different starting substances, i.e., monomers, the molecular mass of the polymer to be produced is primarily regulated by the mole ratio of the two components, in addition to the conversion (see, for example, B. Vollmert "Polymer Chemistry," Springer—Verlag, New York 1973, pages 213 and 214). The mean molecular mass of the polymer is accordingly all the greater, the closer the mole ratio is to 1:1,i.e., in a stoichiometric ratio. With an increasing excess of one of the components, on the other hand, the molecular mass becomes smaller.

In the production of poly-o-hydroxyamides, a mole ratio of 1:1 leads to gel formation, in most cases, which causes the polymer to become unusable. Gel formation in the reaction solution is either observed immediately with the naked eye, or later, when it becomes difficult to filter the solution. Poor filtration is particularly noticeable when filters with a small pore width (for example $\leq 1$ µm) are used, which is common in photolithography. In order to avoid this, one of the starting components is used in excess. In addition to the ability to control the molecular mass, this also results in the advantage that the end groups of the polymer groups are the same and can be blocked with a suitable reagent, if necessary, for example to improve storage stability or to include groups which cross-link at a high temperature and thereby ensure increased shape stability. The amount in excess of the one component must be determined such that there is greater than a 1:1 ratio in order to allow for possible weighing errors or contaminating substances. Therefore, an excess of $\geq 10\%$ is recommended (see EP-OS 0 264 678 and EP-PS 0 291 779). However, as discussed above, this method has the disadvantage of not producing polymers with a comparatively high molecular mass.

SUMMARY OF THE INVENTION

It is an object of the present invention to produce poly-o-hydroxyamides which have a high molecular mass.

It is a further object of the invention to produce poly-o-hydroxyamides which are soluble in alkali and are gel-free.

The above objectives are achieved in accordance with the present invention by adding a solution of an activated dicarboxylic acid derivative to a solution of a bis-o-aminophenol in a lactone, and then adding a tertiary amine to the resulting mixture, where the lactone has the following structure:

where A is —$(CR^1R^2)_m$—or —$(CR^3R^4)_n$—$NR^5$—, $R^1$ to $R^5$ are independent of one another, $R^1$ and $R^2$ are hydrogen, alkyl with 1 to 7 carbon atoms (linear or branched), —$CO(CH_2)_pCH_3$ or —$COO(CH_2)_pCH_3$ with p=0 or 1, $R^3$ and $R^4$ are hydrogen or alkyl with 1 to 3 carbon atoms (linear or branched), $R^5$ is hydrogen or methyl, m is a whole number from 2 to 11, and n is a whole number from 1 to 3.

The ring member A preferably is —$(CR^1R^2)_m$— with m=2 to 5, whereby $R^1$ and $R^2$ have the meaning indicated above. The lactone especially has the structure (I) where A is —$(CR^1R^2)_m$—, m is 2 to 5, and $R^1$ and $R^2$ are independently hydrogen or methyl.

DETAILED DESCRIPTION OF THE INVENTION

The present invention solves the problems of the prior art by using a lactone of a certain structure as the solvent and by conducting the reaction in a particular manner. For the reaction, a solution of bis-o-aminophenol in the lactone is provided to which a solution containing the dicarboxylic acid derivative, preferably in a lactone, is first added. Subsequently, the base is added. The base is used in an undiluted form or, preferably, in the form of a solution, such as in a lactone. As the following examples show, only the combination of a special solvent and a certain sequence of adding the reagents will lead to the desired result.

The poly-o-hydroxyamides produced according to the invention have a molecular mass that is many times higher than that of polymers produced in accordance with the state of the art (EP-OS 0 264 678 and EP-PS 0 291 779), while using the same excess of one of the starting components. These poly-o-hydroxyamides are soluble in many solvents, such as acetone, diethylene glycol diethyl ether and N-methyl pyrrolidone. Another advantage of the method according to the invention is the ability to carry out the reaction with consistent results at room temperature (approximately 21±4° C.). This eliminates the effort and cost associated with a cooling step or low temperature environment. The reaction can, however, also be carried out at temperatures below room temperature.

The lactone, which serves as the solvent, can also be combined with another solvent. The proportion of lactone in the solvent combination is at least 50% by volume. The other solvent is preferably N-methyl pyrrolidone or N,N-dimethyl acetamide or a mixture thereof. γ-butyrolactone is especially preferred as a lactone (A is —$(CH_2)_3$—, i.e., there is a 5 ring). This solvent is particularly useful for commercial production because it is commercially available and inexpensive in large quantities, and it has a high flash point (104° C.) as well as a high ignition temperature (455° C.).

Other lactones which are mentioned by way of example are: β-propiolactone, β-butyrolactone, γ-butyrolactone-γ-carboxylic acid ethyl ester, α-methyl-γ-butyrolactone, γ-valerolactone, δ-valerolactone, γ-caprolactone, ε-caprolactone, nonanic acid-γ-lactone, undecanic acid-γ-lactone, undecanic acid-δ-lactone, undecanic acid-ω-lactone, 4-hydroxy decanic acid lactone, 5-hydroxy decanic acid lactone, 5-hydroxy dodecanic acid lactone, and 12-hydroxy dodecanic acid lactone. The following compounds also have a lactone grouping and are useful in the present invention: 2-oxazolidinone (A is —$(CH_2)_2$—NH—, where NH is bonded to CO), 3-methyl-2-oxazolidinone and 4-isopropyl-2-oxazolidinone.

In the method according to the invention, mixtures of activated dicarboxylic acid derivatives and/or mixtures of bis-o-aminophenols can also be used. The activated dicarboxylic acid derivative is preferably a dicarboxylic acid halogenide, and most preferably an acid chloride or a dicarboxylic acid ester. The tertiary amine, i.e., the base, is preferably pyridine or triethylamine. Other possible bases are heterocyclic tertiary nitrogen compounds, such as quinoline, and aliphatic tertiary amines, such as methyl diethyl amine, as well as aliphatic-aromatic tertiary amines, such as N,N-dimethyl aniline.

If an excess of bis-o-aminophenol is used in the method according to the invention, then the amino end groups of the poly-o-hydroxyamide produced can be capped, i.e., blocked with a dicarboxylic acid anhydride. Cis-5-norbornene-endo-2,3-dicarboxylic acid anhydride is particularly suitable to block the amino end groups.

The following examples are provided to further illustrate the invention. The examples are intended to be illustrative in nature and are not to be construed as limiting the scope of the invention.

EXAMPLE 1

A solution of 9.44 g (0.032 mole) diphenyl ether-4,4'-dicarboxylic acid chloride in 85 mL γ-butyrolactone is dripped into a solution of 14.64 g (0.04 mole) hexafluoro-2,2-bis-(4-hydroxy-3-aminophenyl)-propane in 132 mL γ-butyrolactone, at room temperature, while stirring. A solution of 10.12 g (0.128 mole) pyridine in 10 mL γ-butyrolactone is then slowly dripped into the resulting mixture, at room temperature, and the resulting reaction solution is stirred for another 20 hours at room temperature. Subsequently, the end groups are blocked, for which purpose a solution of 2.62 g (0.016 mole) cis-5-norbornene-endo-2,3-dicarboxylic acid anhydride in 25 mL γ-butyrolactone is added at room temperature. Stirring continues for another 24 hours. Then the reaction solution is precipitated with a mixture of isopropanol and water, washed, and dried.

Using gel permeation chromatography, the poly-o-hydroxyamide produced in this way is determined to have a molecular mass of 32000 g/mole (mean weight). The poly-o-hydroxyamide is clearly soluble in commercial aqueous-alkaline developers. A solution of 30% by mass of the polymer, for example in diethylene glycol diethyl ether, can be filtered without problems via a plastic syringe equipped with a membrane filter having a pore size of 1 μm.

EXAMPLE 2 (Comparison Example)

In accordance with the state of the art (EP-OS 0 264 678 and EP-PS 0 291 779), 14.64 g (0.04 mole) hexafluoro-2,2-bis-(4-hydroxy-3-aminophenyl)-propane are dissolved in 132 mL N,N-dimethyl acetamide, together with 10.12 g (0.128 mole) pyridine, while stirring, and the mixture obtained is then cooled to a temperature of −10° C. A solution of 9.44 g (0.032 mole) diphenyl ether-4,4'-dicarboxylic acid chloride in 85 mL N,N-dimethyl acetamide is then slowly dripped into this mixture. Subsequently, the reaction solution obtained is first stirred for another 60 minutes at −10° C. and then for 20 hours at room temperature. To block the end groups, a solution of 2.62 g (0.016 mole) cis-5-norbornene-endo-2,3-dicarboxylic acid anhydride in 25 mL N,N-dimethyl acetamide is subsequently added at room temperature, and stirring continues for another 24 hours. Then the reaction solution is precipitated with a mixture of isopropanol and water, washed, and dried.

The molecular mass of the polymer, determined by means of gel permeation chromatography, under conditions identical to those in Example 1, is only 6500 g/mole (mean weight). The same result is also obtained if the acid chloride is dissolved in cyclohexanone instead of in N,N-dimethyl acetamide.

EXAMPLE 3 (Comparison Example)

Polymerization takes place in a manner corresponding to Example 1, but with the difference that N,N-dimethyl acetamide is used as the solvent, instead of γ-butyrolactone. The molecular mass of the polymer, determined by means of gel permeation chromatography, under conditions identical to those in Example 1, is only 4500 g/mole (mean weight).

EXAMPLE 4 (Comparison Example)

Polymerization takes place in a manner corresponding to Example 2, but with the difference that γ-butyrolactone is used as the solvent, instead of N,N-dimethyl acetamide. After 20 hours of stirring at room temperature, i.e., before blocking the end groups, numerous gel particles are found in the reaction solution, with the naked eye. The reaction solution and the resulting polymer are therefore not usable for the intended purpose.

Although the foregoing invention has been described in some detail by way of illustration and example for purposes of clarity of understanding, it will be evident that certain changes and modifications may be practiced within the scope of the appended claims.

What is claimed is:

1. A method for producing poly-o-hydroxyamides comprising:

mixing a solution of an activated dicarboxylic acid derivative with a solution of a bis-o-aminophenol in a lactone, wherein the lactone has the following structure:

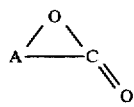
(I)

where A is —$(CR^1R^2)_m$— or —$(CR^3R^4)_n$—$NR^5$—, $R^1$ to $R^5$ have independent of one another the following meaning, $R^1$ and $R^2$ are hydrogen, alkyl with 1 to 7 carbon atoms (linear or branched), —$CO(CH_2)_pCH_3$, or —$COO(CH_2)_pCH_3$ with p=0 or 1

$R^3$ and $R^4$ are hydrogen or alkyl with 1 to 3 carbon atoms (linear or branched)

$R^5$ is hydrogen or methyl, m is a whole number from 2 to 11, n is a whole number from 1 to 3, and adding a tertiary amine to the mixture.

2. The method according to claim 1, wherein A is —$(CR^1R^2)_m$—, $R^1$ and $R^2$ are hydrogen or methyl, and m is 2 to 5.

3. The method according to claim 1, wherein the activated dicarboxylic acid derivative is selected from the group consisting of an acid halogenide and an acid ester.

4. The method according to claim 1, wherein the tertiary amine is in solution.

5. The method according to claim 1, wherein the tertiary amine is selected from the group consisting of pyridine and triethyl amine.

6. The method according to claim 1, wherein the activated dicarboxylic acid derivative is a mixture of activated dicarboxylic acid derivatives.

7. The method according to claim 1, wherein the bis-o-aminophenol is a mixture of bis-o-aminophenols.

8. The method according to claim 1, wherein the lactone is combined with another solvent such that the lactone proportion is at least 50% by volume.

9. The method according to claim 8, wherein the other solvent is selected from the group consisting of N-methyl pyrrolidone and N,N-dimethyl acetamide.

10. The method according to claim 1, wherein the lactone is γ-butyrolactone.

11. The method according to claim 1, wherein the amino end groups are capped with a dicarboxylic acid anhydride.

* * * * *